(12) United States Patent
Zdravkovic

(10) Patent No.: US 6,715,089 B2
(45) Date of Patent: Mar. 30, 2004

(54) REDUCING POWER CONSUMPTION BY ESTIMATING ENGINE LOAD AND REDUCING ENGINE CLOCK SPEED

(75) Inventor: Andrej Zdravkovic, North York (CA)

(73) Assignee: ATI International SRL (BB)

( * ) Notice: Subject to any disclaimer, the term of this patent is extended or adjusted under 35 U.S.C. 154(b) by 596 days.

(21) Appl. No.: 09/767,086

(22) Filed: Jan. 22, 2001

(65) Prior Publication Data

US 2002/0099964 A1 Jul. 25, 2002

(51) Int. Cl.[7] ............................ G06F 1/32; G06F 1/06
(52) U.S. Cl. ........................ 713/322; 713/501
(58) Field of Search ............................ 713/320, 322, 713/501, 600, 601

(56) References Cited

U.S. PATENT DOCUMENTS 6,519,706 B1 * 2/2003 Ogoro ...................... 713/322

* cited by examiner

*Primary Examiner*—Thomas M. Heckler
(74) *Attorney, Agent, or Firm*—Volpe and Koenig, P.C.

(57) ABSTRACT

A computer system has at least one processor and at least one queue for storing instructions for execution by the processor. The processor is capable of being clocked at a plurality of rates. A number of instructions in the queue is measured. The optimum clock rate is selected based on in part the determined number of queued instructions.

10 Claims, 4 Drawing Sheets

REDUCING POWER CONSUMPTION BY ESTIMATING ENGINE LOAD AND REDUCING ENGINE CLOCK SPEED

BACKGROUND

The invention relates to power management in a computer system. More particularly, the invention relates to reducing power consumption of microprocessors in a computer system.

Reducing power consumption in computer systems is highly desirable. Reduced power consumption decreases the heat generated by the system. As the packaging of computer systems becomes more compact, the dissipation of heat generated by the system is difficult. Accordingly, it is desirable to reduce the generated heat by reducing power consumption. Additionally, portable or handheld computer systems usually rely on portable power supplies or batteries. Lower power consumption prolongs the usage of a single battery or power supply without a recharge.

The clock frequency of a microprocessor has a highly correlated relationship with the power consumption. The same microprocessor running with a higher clock frequency consumes more power and produces more heat than the same microprocessor running with a lower clock frequency. A typical computer system fixes the clock frequency of its microprocessor at initialization. Therefore, instead of running at the initialized clock frequency in both busy or idle modes, it is better to switch the system to a lower clock frequency if the computer is in an idle mode. One approach to triggering a reduction in clock frequency is to monitor inputs from input devices, such as a keyboard, mouse, or trackball. If there is no input from any of the input devices, for a predetermined period of time, the system will automatically switch from a normal system clock frequency to a slower one. The clock frequency returns to normal when the system receives an input from an input device, such as a keystroke or mouse movement. The input monitoring approach has drawbacks. Although the computer is not receiving an input, it may be engaged in heavy data processing, which a reduced clock frequency hinders this heavy processing.

Another approach for triggering a reduction in clock frequency is to analyze the number of instructions executed by the microprocess for a predetermined period of time. If the number of executed instructions is low, the clock frequency is reduced. If the number of executed instructions increases, the clock frequency is increased to normal. One drawback to analyzing past instruction execution is that the past number of instructions may not accurately reflect future processing requirements. Accordingly, it is desirable to have alternate approaches to reduce power consumption.

SUMMARY

A computer system has a processor and a queue for storing instructions for execution by the processor. The processor is capable of being clocked at a plurality of different clock frequencies. A number of instructions in the queue is measured. A particular clock frequency is selected for the microprocessor based on in part the determined number of queued instructions.

DESCRIPTION OF THE PREFERRED EMBODIMENTS

Figure 1:
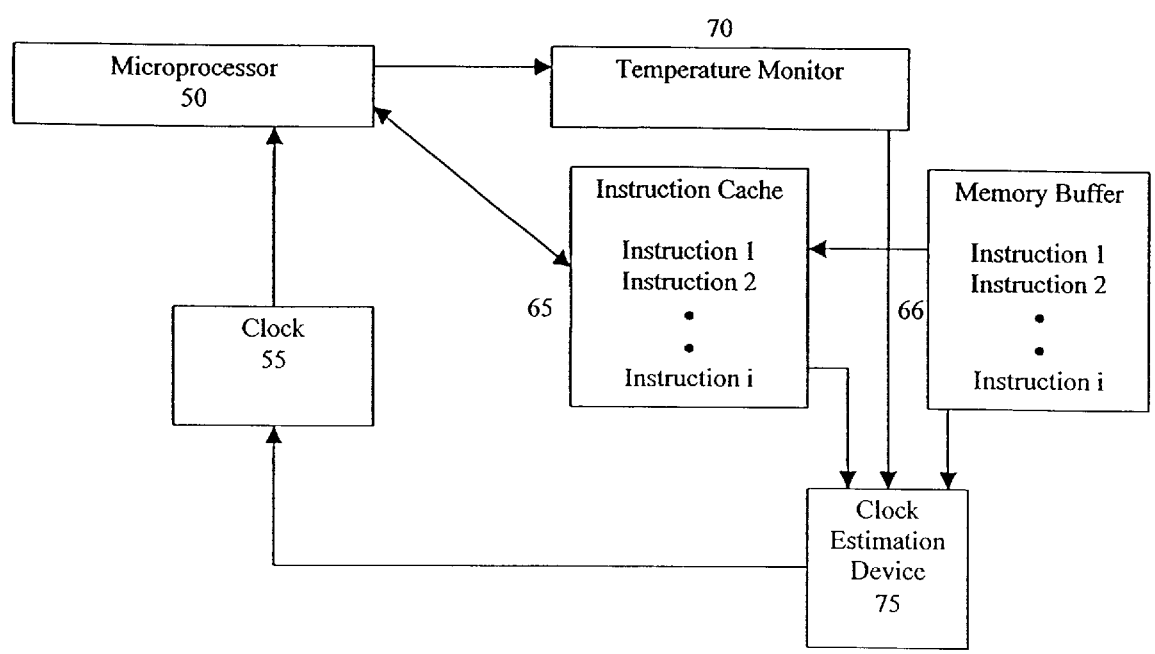
FIG. 1 is a simplified diagram illustrating the functional relationships among the microprocessor, system clock and instruction cache.

A computer system for reducing power consumption mechanism with various clock frequencies is shown in FIG. 1. The clock 55 provides a clocking signal for a microprocessor 50. The microprocessor 50 may be a central processing unit (CPU), a graphics processor, such as a D3D engine, or any other processor. The microprocessor 50 has an associated instruction cache 65. The cache 65 stores instructions for execution by the microprocessor 50. The cache 65 may be on the same chip as the microprocessor 50 or off chip. The system also has a memory buffer 66 storing instructions to be input to the instruction cache 65.

A load and estimation clock device 75 is used to control the clocking rate of the system. The estimation device 75 controls the frequency of the clock signal being input into the microprocessor 50. Based on a control signal from the estimation device 75, the clock 55 outputs the selected clocking frequency for the microprocessor among a plurality of available clock frequencies.

One approach to selecting the clock frequency is to analyze the queued instructions. Initially, the microprocessor 50 is set to run at an initialization clock frequency. All instructions waiting to be executed by the microprocessor 50 will be first queued at the memory buffer 66. The instructions queued in the memory buffer 66 are fed to the instruction cache 65 to be queued for execution by the microprocessor 50. Subsequent clock frequencies are estimated based on the number of queued instructions.

To further optimize the system's performance, the estimation device 75 analyzes the types of instructions queued. Certain instructions require more intense processing than others. To compensate for the varying intensities, each instruction is weighted based on its intensity.

Additionally, the estimation device 75 may use the measured microprocessor temperature, as determined by the temperature monitor 70, to maintain the computer system at an acceptable range of operating temperature. If the temperature of the microprocessor 50 is approaching an unacceptable level, the power consumption may need to be reduced to prevent circuit damage regardless of the backlog of instructions. To compensate for temperature, the clock estimation device 75 factors in the measured temperature.

Figure 2:
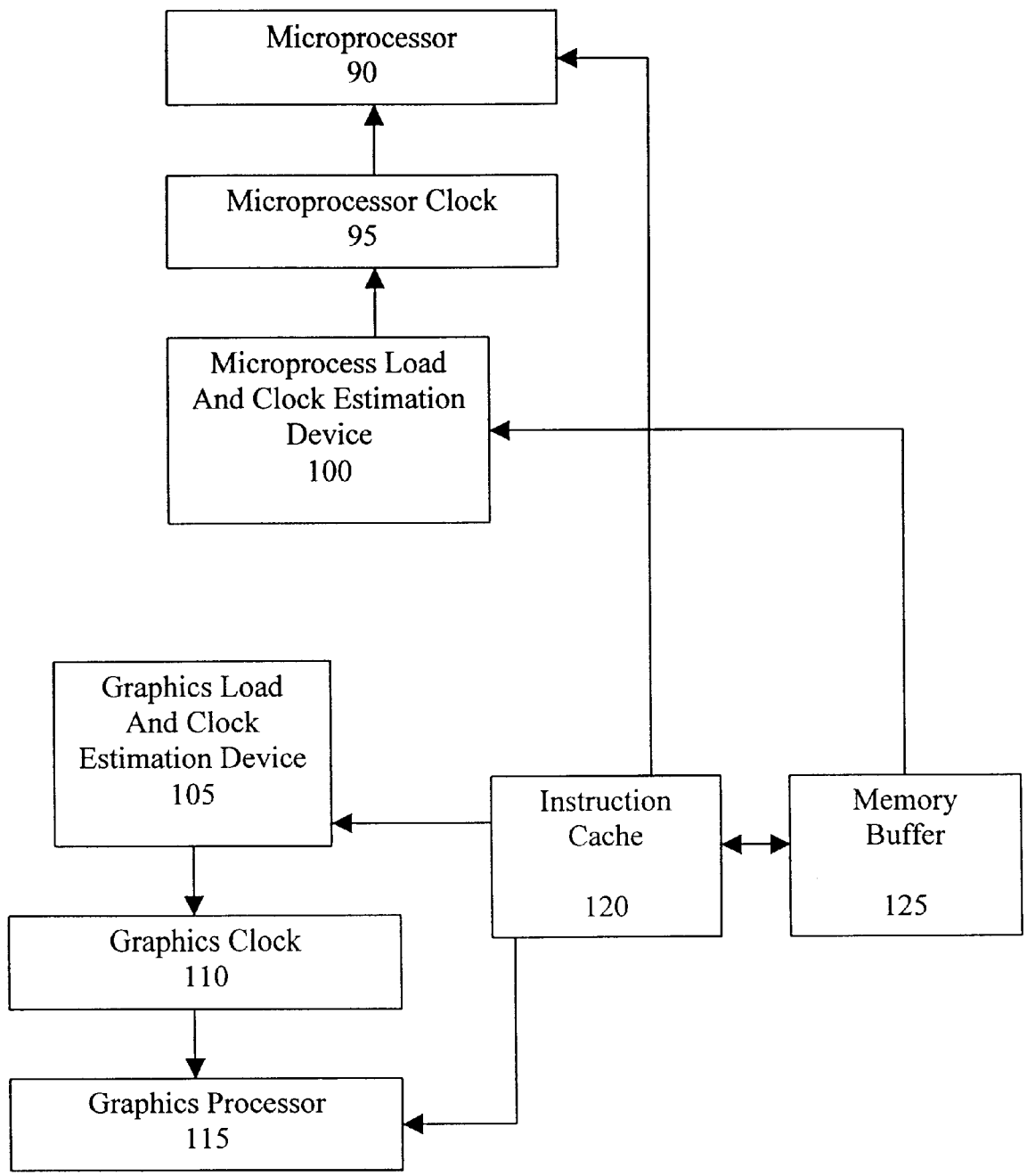
FIG. 2 is a functional block diagram of a computer system with separate reducing power consumption mechanisms for the microprocessor and the graphics processor.

FIG. 2 illustrates a computer system having separate monitoring mechanisms for a microprocessor 90 and a graphics processor 115. The microprocessor 90 and the graphics processor 118 have its own clock estimation device 100, 105. Each estimation device 100, 105 controls the clocking frequency of its processor 90, 115.

One advantage to the individual monitoring of the two processors 90, 115 is that synchronization between the two estimation devices 100, 105 can be achieved. One estimation device 100, 105 can use the other devices 105, 100 information to determine its clocking frequency. One situation where this synchronization may be desirable is when one processor 90, 118 has a larger backlog of instructions than the other 115. Although the estimation device 105 for the smaller backlog processor 110, 118 indicates a higher clocking speed, the clocking speed may be reduced to equalize the backlog between the microprocessors 90, 115. The equalization may improve the system's performance.

Figure 3:
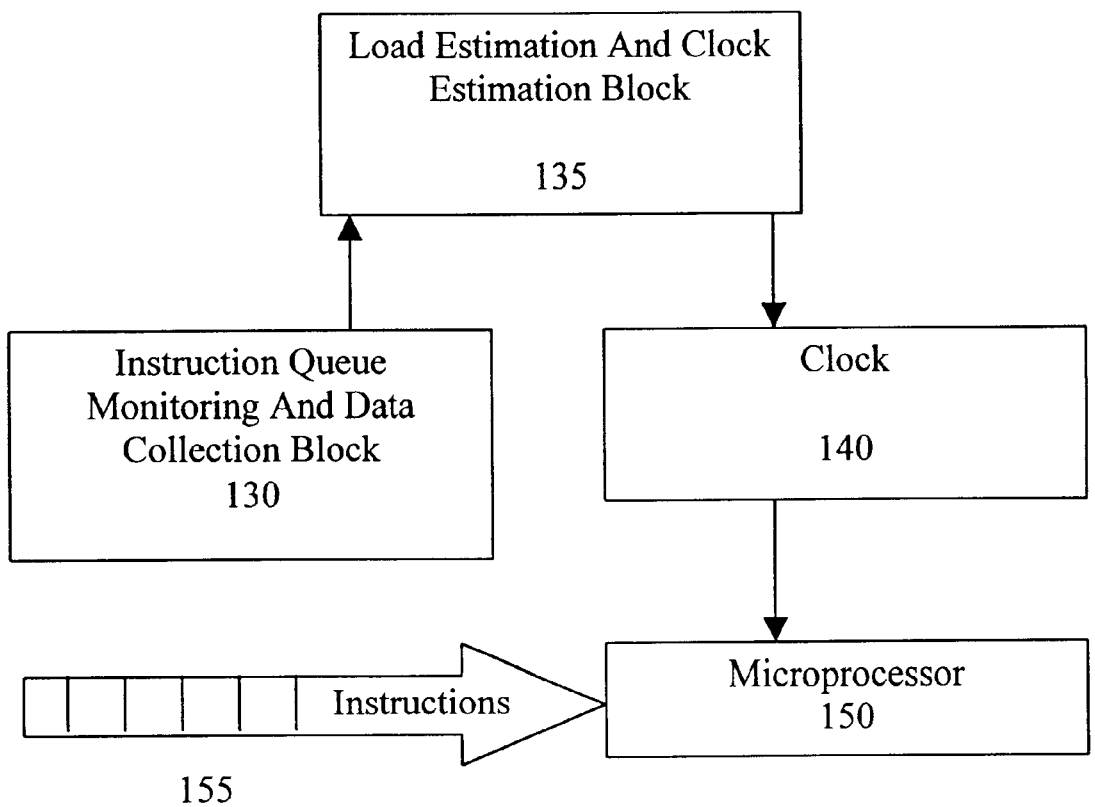
FIG. 3 shows that the clock estimation device in detail blocks.

Another approach to estimating the clock frequency is to analyze the complexity of a set of n instructions 055, as shown in FIG. 3. Within the clock estimation device 100 or 105, an instruction queue monitoring and data collection block 130 collects information concerning the n instructions 155 which are queued in either queues 65 or 66. Based on the system design and the clock estimation algorithm latency, the set of n instructions may not be the next n instructions for execution by the microprocessor 150 in the queues 65, 66. To illustrate the following instructions are queued for execution.

$$\ldots, I_k+n+1, I_k+n, I_k+n-1, \ldots, I_k+n, I_k, \ldots, I;$$

I is the instruction ready for execution. $I_k$ is the first queued instruction selected for analysis. According to $1_x$, the last instruction selected for analysis is $I_k+n$. The resulting latency in the queue is k−i. Based on the flexibility of the clock adjustment circuitry, the number of instructions n and algorithm latency k−I can be chosen to perform clock optimization frequently or in longer periods. A load estimation and clock estimation block 135 takes the collected data and estimates the required microprocessor performance. Based on the load estimation, a clock frequency is selected. To reduce processing, instead of analyzing the entire instruction set, a moving average of the instruction's intensity can be taken. The moving average allows for a new load estimate every instruction cycle.

One approach to load and clock estimation uses a fuzzy logic controller. Using fuzzy logic, the n instructions are grouped into fuzzy sets, such as five sets. To illustrate, five fuzzy sets based on estimated engine load are very high load, high load, medium load, low load and very low load. The fuzzy controller outputs a fuzzy variable. After defuzzication of the fuzzy variable, the clock frequency is determined. Additional inputs may be added to the fuzzy controller, such as the current clock frequency, the processor's draw of current and the temperature. To more adaptively adjust the clock control algorithm, a neural network controller is used. The control algorithm is learned by the neural network controller.

Figure 4:
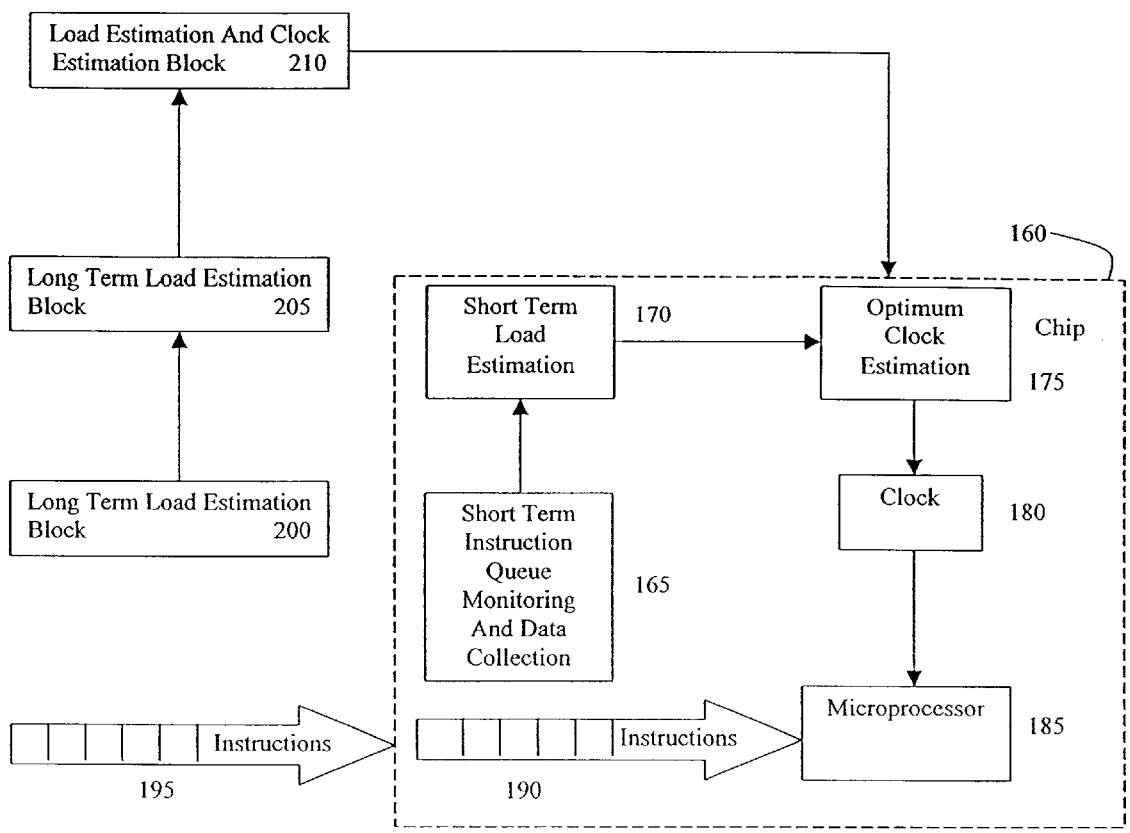
FIG. 4 shows a functional block diagram of a computer system with long term and short term load estimation mechanisms.
Figure 2:
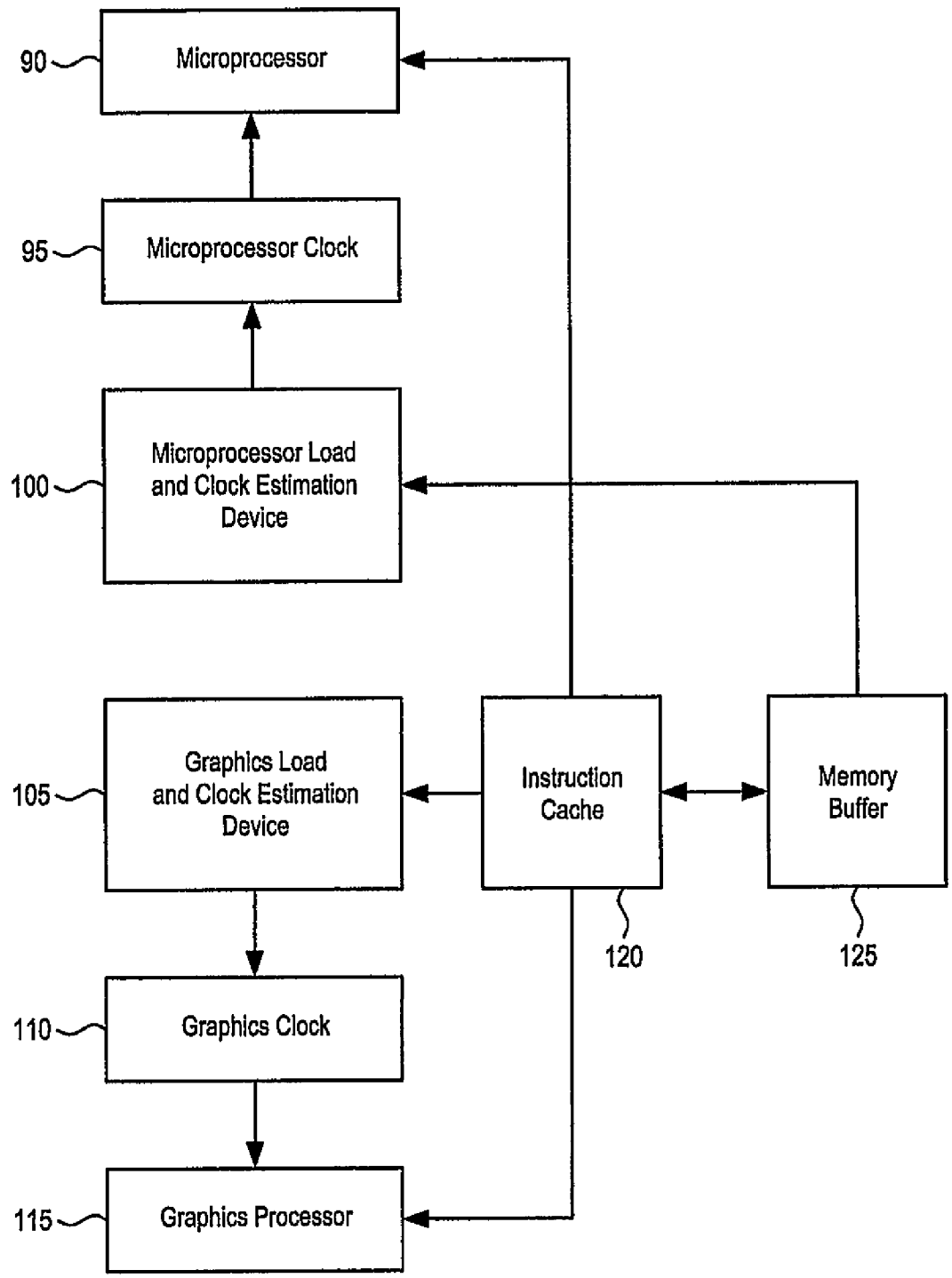

To enhance performance, a short term and a long term estimate may be used, as shown in FIG. 4. Built onto the microprocessor chip 160 is a short term estimation load estimation blocks 165, 170. The short term blocks analyze a set of instructions 190 stored in a cache on the chip. Since the analysis is performed on a silicon level, the analysis is performed frequently.

A long term load estimation blocks 200, 205, 210 analyze a set of instructions 195 queued off-chip, such as in an off-chip cache or in memory. Based on the long term analysis, a long term optimum clock estimation block 175 determines a preferred long term clocking frequency. The update of the long term frequency may be performed at the same or a lower rate then the short term analysis. On chip, an optimum clock estimation block determines the clock frequency based on the short term analysis and the preferred long term clocking frequency. Using this two tier approach, short term performance can be adjusted at a fast rate.

What is claimed is:

1. A method for reducing power consumption of at least one processor in a system, the processor is associated with at least one queue for storing instructions for execution by the processor, the method comprising:

analyzing instructions stored in the queue;

determining a load estimation based on in part a result of the analyzing;

selecting a clock rate out of a plurality of clocking rates based on in part the determined load estimation; and clocking the processor at the selected clock rate.

2. The method of claim 1, wherein the analization result comprises a determination of the number of the queued instructions.

3. The method of claim 1, wherein the analization result comprises a determination of processing required by each queued instruction.

4. The method of claim 1, wherein the load estimation is based on in part a temperature of the microprocessor.

5. The method of claim 1, wherein at least one processor means having two microprocessors in the system, a first microprocessor is for general purpose and a second processor is for graphic processing purpose, the method comprising:

queuing all instructions at a first instruction queue;

distributing non graphic related instructions to be queued at a second instruction queue where said first microprocessor executes queued instructions from; and distributing graphic related instructions to be queued at a third instruction queue where said second microprocessor executes queued instructions from.

6. The method of claim 1, wherein at least one queue for storing instructions means having two queues, the method comprising:

queuing instructions at a first instruction queue and distributing instructions queued at said first instruction queue to a second instruction queue where said processor executes the queued instructions from.

7. The method of claim 6, wherein determining a load estimation further comprising using the first number of instructions queued at said first instruction queue and the second number of instructions queued at said second instruction queue as separate control factors.

8. A system having means for reducing power consumption of at least one processor, the processor is associated with at least two queues for storing instructions for execution by the processor, the system comprising:

means for queuing instructions at a first instruction queue;

means for distributing instructions queued at said first instruction queue to a second instruction queue where said processor executes the queued instruction from;

means for analyzing instructions stored in the queues;

means for determining a load estimation based on in part a result of the analyzing;

means for selecting a clock rate out of a plurality of clocking rates based on in part the determined load estimation; and means for clocking the processor at the selected clock rate.

9. The system of claim 8, wherein means for instructions queued in said first instruction queue and the instructions queued in said second instruction queue as separate control factors.

10. The system of claim 8, wherein at least one processor means having two microprocessors in the system, a first microprocessor is for general purpose and a second processor is for graphic processing purpose, comprising:

means for queuing all instructions at a first instruction queue;

means for distributing non graphic related instructions to be queued at a second instruction queue where said first microprocessor executes queued instructions from; and means for distributing graphic related instructions to be queued at a third instruction queue where said second microprocessor executes queued instructions from.

* * * * *

UNITED STATES PATENT AND TRADEMARK OFFICE
CERTIFICATE OF CORRECTION

PATENT NO. : 6,715,089 B2  
APPLICATION NO. : 09/767086  
DATED : March 30, 2004  
INVENTOR(S) : Andrej Zdravkovic It is certified that error appears in the above-identified patent and that said Letters Patent is hereby corrected as shown below:

ON THE TITLE PAGE

Item (52), delete "713/322" and insert therefor --713/320--.

IN THE DRAWINGS

Please replace Figure 2 in the patent with replacement Figure 2. In item 100, delete "microprocess" and insert therefor --microprocessor--.

IN THE SPECIFICATION

At column 1, line 46, after the word "the", delete "microprocess" and insert therefor --microprocessor--.

At column 2, line 4, after the word "shows", delete "that".

At column 2, line 5, delete "blocks".

At column 2, line 54, after the word "processor", delete "118" and insert therefor --115--.

At column 2, line 63, after the word "90,", delete "118" and insert therefor --115--.

At column 2, line 65, after the word "110,", delete "118" and insert therefor --115--.

At column 3, line 2, after the word "instructions", delete "055" and insert therefor --155--.

At column 3, line 12, delete "..., $I_k+n+1, I_k+n, I_k+n-1, ..., I_k+n, I_k, ..., I;$", and insert therefor --..., $I_k+n+1, I_k+n, I_k+n-1, ..., I_k+1, I_k, ..., I;$--.

At column 3, line 15, after the word "to", delete "$1_x$" and insert therefor --$I_k$--.

At column 3, line 19, after the word "latency", delete "k-I" and insert therefor --k-i--

At column 3, line 41, after the word "160", delete "is a" and insert therefor --are--.

UNITED STATES PATENT AND TRADEMARK OFFICE
CERTIFICATE OF CORRECTION

PATENT NO. : 6,715,089 B2
APPLICATION NO. : 09/767086
DATED : March 30, 2004
INVENTOR(S) : Andrej Zdravkovic It is certified that error appears in the above-identified patent and that said Letters Patent is hereby corrected as shown below:

At column 3, line 46, before the word "load", delete "A long" and insert therefor --Long--.

At column 3, line 52, after the word "rate", delete "then" and insert therefor --than--.

IN THE CLAIMS

In claim 2, column 4, line 1, after the words "wherein the", delete "analization" and insert therefor --analyzation--.

In claim 3, column 4, line 4, after the words "wherein the", delete "analization" and insert therefor --analyzation--.

Signed and Sealed this

Twenty-third Day of October, 2007

JON W. DUDAS
*Director of the United States Patent and Trademark Office*